Aug. 14, 1945.                 H. A. HUSTED                    2,381,909
                    PERISCOPIC VIEWING AND SIGHTING DEVICE
                    Filed Aug. 7, 1942           2 Sheets-Sheet 1
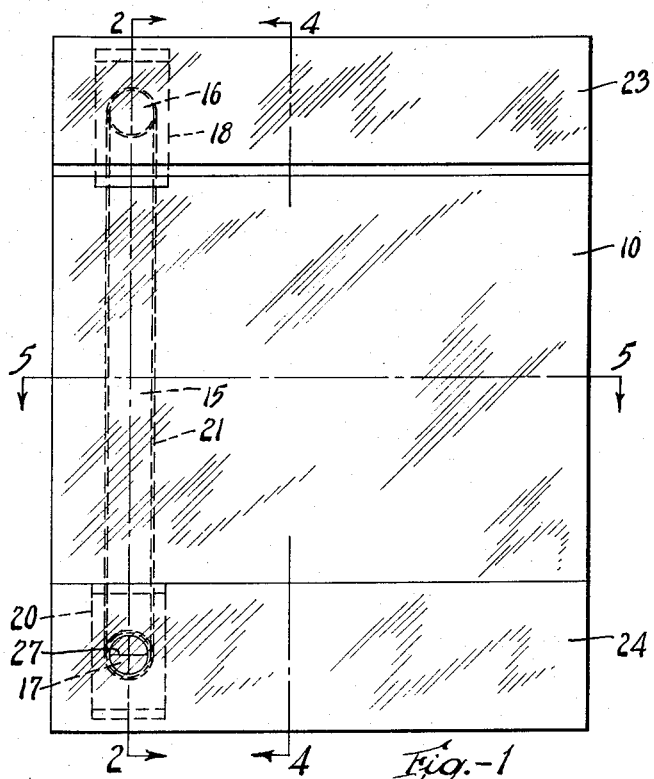
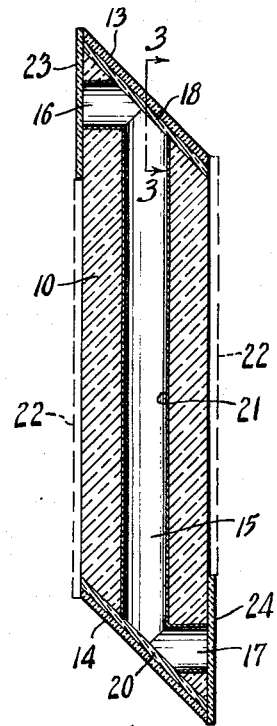
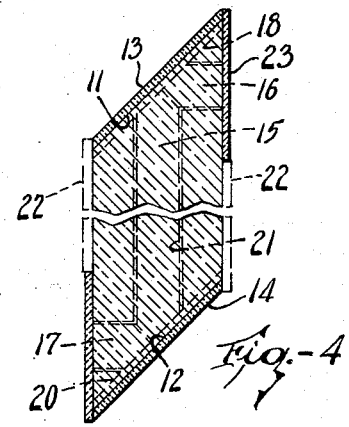
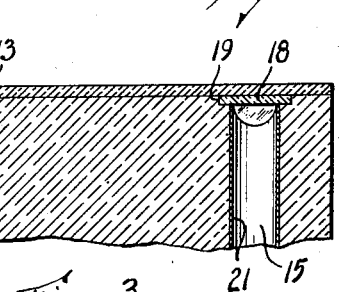
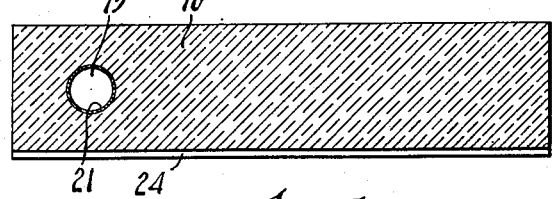
INVENTOR
HARRY A. HUSTED
BY Hyde and Meyer
ATTORNEYS Aug. 14, 1945.  H. A. HUSTED  2,381,909
PERISCOPIC VIEWING AND SIGHTING DEVICE
Filed Aug. 7, 1942  2 Sheets-Sheet 2
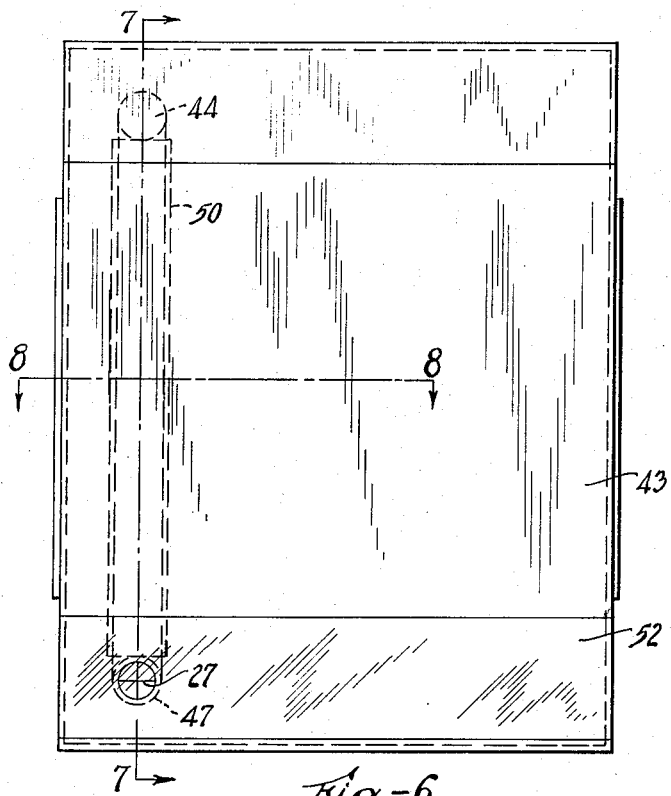
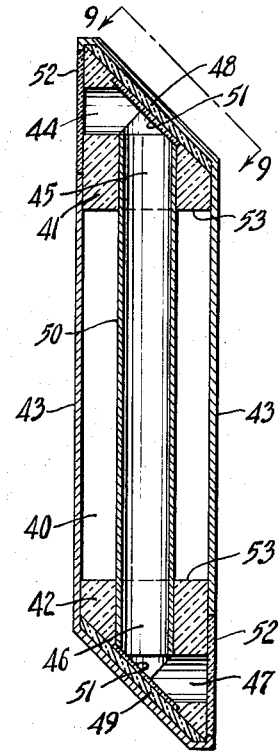
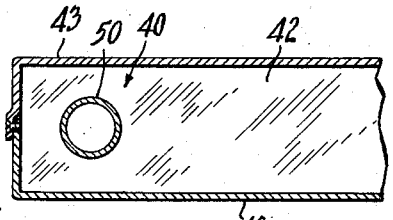
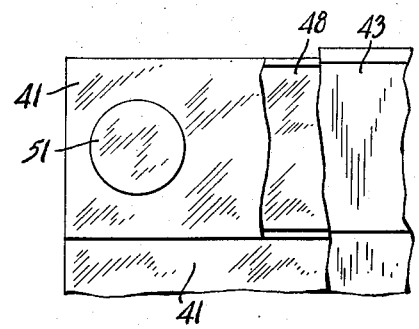
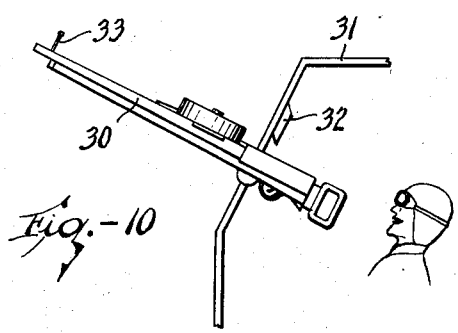
INVENTOR
HARRY A. HUSTED
BY Hyde and Meyer
ATTORNEYS Patented Aug. 14, 1945

2,381,909

UNITED STATES PATENT OFFICE 2,381,909

PERISCOPIC VIEWING AND SIGHTING DEVICE

Harry A. Husted, St. Clair, Mich., assignor to The Standard Products Company, Detroit, Mich., a corporation of Ohio Application August 7, 1942, Serial No. 453,947

3 Claims. (Cl. 88—1)

The invention relates to an improved periscopic sighting and viewing device, and more particularly to devices of this kind designed to afford not only a rather wide general periscopic field of view of objects on the other side of a wall or barrier, but also other means, likewise periscopic, with a more limited or concentrated field of view, for the directional sighting and control of a gun which protrudes, at least in part, through said wall or barrier.

As will appear from the accompanying drawings, in conjunction with the detailed description hereinafter set forth, the invention comprises a novel and improved indirect vision device which angularly diverts rays of light from an object under observation through one or more successive changes in direction before said light rays meet the eye of an observer. Such devices are obviously useful in armored tanks, airplanes, armored gun emplacements, or in any location where it is desirable and feasible to protect the operator from bullets, shrapnel, or flying missiles.

The present invention has for one of its objects the provision of a shatterproof prismatic element suitable not only for more or less wide general observation, but also incorporating therein novel and improved indirect vision means, with more limited field of view, for sighting ordnance which is under the control of the observer.

Other objects and advantages of devices embodying the present invention will appear from the following description thereof, reference being had to the acccompanying drawings, in which Fig. 1 is an elevation of a viewing and sighting device, as seen from the observer's position.

Fig. 2 is a vertical section taken on the line 2—2 of Fig. 1.

Fig. 3 is a section taken on the line 3—3 of Fig. 2.

Fig. 4 is a section taken on the line 4—4 of Fig. 1.

Fig. 5 is a section taken on the line 5—5 of Fig. 1.

Fig. 6 is a view similar to Fig. 1 but showing a somewhat modified form of the invention.

Fig. 7 is a section taken on the line 7—7 of Fig. 6.

Fig. 8 is a section taken on the line 8—8 of Fig. 6.

Fig. 9 is a top plan view of Fig. 6, parts being broken away.

Fig. 10 is a sketch illustrating one method of using the device herein described and indicating the relative positions of an operator, a viewing and sighting device, and a gun.

Before the present invention is described in detail, it is to be understood that such invention is not limited to the details of construction or to the specific arrangement of parts herein illustrated or described, as the invention obviously may take other forms. It also is to be understood that the phraseology or terminology herein employed is for the purpose of description and not of limitation.

The embodiment shown in Figs. 1 to 5 includes a transparent, shatterproof, prismatic body 10 of rhombohedral contour having two cooperating surfaces 11 and 12 which are angularly disposed to light rays, and whereby entering rays are diverted through said body, and are emitted along lines out of lineal registry with their lines of entry. Such diversion may be by internal reflection directly from the aforesaid surfaces 11 and 12, or from mirror means coated thereon or carried thereby. In the present instance I have shown upper and lower mirrors 13 and 14, respectively adhesively united to surfaces 11 and 12 so as to be permanently attached thereto.

The prismatic body 10 is preferably formed from organic plastic material of optical characteristics quite similar to glass, such material being preferably obtainable from the group of organic plastics known as the acrylates. The acrylates have excellent light transmission properties, are thermoplastic, and are readily moldable to desired contours. A material of this type, which has been found to be quite suitable, is sold commercially under the trade name "Plexiglas." It crumbles harmlessly rather than shatters on severe impact, such as occurs if it is struck by a bullet.

In the embodiments described herein the mirrors 13 and 14 consist of strips of plate glass substantially coextensive in area with the end surfaces 11 and 12. The strips 13 and 14 carry a mirrored surface on one face, and are cemented to the Plexiglas surfaces 11 and 12 by means of a very thin film (not shown) of any suitable transparent adhesive of refractive index and other optical properties similar to the Plexiglas.

As best indicated in Figs. 1 to 3, the shatterproof block 10 is provided with a longitudinal bore or passage 15 extending completely through its vertical height. Communicating with the upper and lower ends, respectively, of said vertical passage are two horizontal branch passages 16 and 17 extending in opposite directions from, and at right angles to, said passage 15. It will be apparent that all light rays coming horizontally from the left in Fig. 2 and impinging upon mirror 13 are reflected downwardly to mirror 14 and thence horizontally, but only that group of rays which enters passage 16 will be transmitted successively through passages 15 and 17, the remaining rays being transmitted through the Plexiglas material, as heretofore indicated. As will soon appear, rays passing through the passages 16, 15, 17, serve to delineate a specific portion of the total field of vision of the device, and the image thereby produced cooperates with gun sighting means to enable the operator to accurately aim the gun.

The more or less cylindrical light path defined by passages 15, 16 and 17, as they are shown, may be shielded from possible disturbances arising from light reflection or refraction originating externally thereto. This may be accomplished by suitably coating or covering the surfaces of said passages. For example, the coating, marked 21, may be a thin tube of metal, opaque plastic, or other suitable material inserted into passage 15, or may be a layer of light absorbing paint applied to cut down internal reflection. Again, the internal peripheral wall of passage 15 may be given a white priming coating to reduce the apparent prominence of the light channel defined by said passage, and, if desired, a dead black light absorbing second internal coating (not shown) may be applied on the white primer.

The aperture in the upper angular face 11 of body 10, which represents the common terminus of passages 15 and 16, may be suitably closed, such as by means of a glass cover strip 18 which may be conveniently retained in a grooved channel 19 in the end face, said channel being of such depth that the outer surface of the cover strip is in planar registry with the balance of face 11. This strip 18 is placed in position before the mirror 13 is adhesively attached, and is consequently held in position by adhesive contact with the mirror. Strip 18 serves also to prevent excess adhesive from flowing into the passageways in block 10. A similar strip 20 may be fitted in a suitable channel in a corresponding position and manner in the lower face 12.

The optical unit, comprising the shatterproof body 10, with its accompanying sighting channels, is removably housed in a bulletproof mount 22 indicated in Fig. 2 merely by dotted outline. The actual light transmitting portions of the longitudinal faces are not armored, but usually may be provided with thin well ground facing plates 23 and 24 of optical glass, of low light absorption, which plates may be removably retained by the mounting, or may be adhesively attached to the Plexiglas block. They represent the only portion of the optical unit which ordinarily is exposed, and being of a relatively more scratchproof character than the Plexiglas, they may be freely and frequently cleaned in any customary manner. They further serve to prevent entry of dirt or moisture to the sighting passageways 15, 16, 17.

It is apparent that an observer normally positioned with his eyes on a level with lower facing plate 24 (Fig. 2) is out of line with the direct path of a bullet or other missile, which is stopped by mount 22 and can enter only through facing plate 23. The Plexiglas material is shatterproof and consequently the observer is protected from flying splinters, although of course the optical unit would be rendered inoperative by a direct hit. To provide for such contingency, the housing 22 is usually designed to permit rapid removal of a damaged unit, and immediate substitution of a replacement.

I have heretofore intimated that the periscopic device just described supplies to the operator a reasonably wide field of vision external to a wall which carries the optical unit. The angular extent of the field of view is determined by the dimensions of the rhombohedral body 11, and specifically by the cross sectional area of the group of light rays intercepted and diverted by the mirrors 13 and 14. For practical purposes the angular field of view may be regarded as substantially equivalent to the field of view which would appear to an operator looking through a slot of the dimensions of facing strip 23 when his eye is at a distance from the slot about equal to the total lineal path of a light ray through block 10.

But the present device, in addition to the aforesaid wide field of view, also provides a more restricted or concentrated field of view which is very clear and bright and which provides reasonable contrast with respect to the wider field, thereby assisting in aiming purposes. For this purpose, a fractional portion of the entire field of view is here emphasized in circular outline, resulting from the fact that the light rays transmitted through passages 15, 16, and 17 are bunched in pencil form and travel practically entirely through an air gap closed at both ends by the cover plates 23, 24, the effect of which is negligible. This limited portion of the field is therefore materially brighter than the balance of the view, since the light rays producing it do not pass through the Plexiglas body, and consequently suffer no loss of intensity by its light absorption, in addition to which the air gap through said passages introduces no error of refraction.

A reticular design 27 (Fig. 1) consisting of crossed lines, concentric circles, or other suitable aligning indicia, may be engraved on either facing strip 23 or 24, opposite passage 16 or 17, or may be otherwise provided and positioned in the light passages 15, 16, 17, so that to the operator's view it will seem superposed upon the brighter restricted circular portion of the field of view above described. Any suitable reference point or zone on this design may be aligned with a gun sight for the purpose of sighting and aiming the gun as will immediately appear.

Referring to Fig. 10, I have indicated, without attempt at detailed accuracy, an arrangement wherein a gun 30 is mounted in fixed relationship to an armorplate shield 31, whereby gun and shield swivel as a unit around a pivot or axis (not shown). The shield 31 is perforated to permit the barrel of the gun to protrude therethrough. The operator is in a protected position behind the shield, and uses the periscopic device 32, described in detail hereinabove, to observe objects in front. The scope of forward vision may of course be enlarged by swinging or pivoting the whole assembly including shield, gun, and periscope. The gun is fixed with relation to the periscope and its mount in such manner that a sighting means 33 carried on the gun barrel will appear to the operator to be superposed on some reference zone on the engraved reticle above described. In actual fact, therefore, the reticle constitutes the rear sight of the gun, and the gun is aimed by swinging the whole mounting until the front sight and the reticle are aligned with the object. Corrections for various ranges may be made by using various reference zones on the reticle for alignment with the front sight, in manner familiar to marksmen.

A somewhat modified form of the invention is illustrated in Figs. 6 to 9 inclusive. In the embodiment there shown the light reflecting end portions of the transparent shatterproof block have been retained but a substantal portion of the body has been eliminated, thereby leaving one or more air spaces 40 (Fig. 7). The prismatic end portions 41 and 42 may be retained in suitably spaced relationship in a housing 43 in any convenient manner. As in the previous embodiment, a restricted portion of the field of view is again provided by a body of rays which are transmitted successively through air passages 44, 45, 46 and 47, being reflected in their path therethrough by mirrors 48 and 49. The vertical portion of the light path is bounded by an opaque tube 50 of metal, plastic, or other suitable material. Circular cover disks 51 of optical glass are inset in suitable countersunk recesses in the upper and lower angular prism faces, and perform the same function as the cover strips 18 and 20 of the first described embodiment. Facing plates 52, also of optical glass, likewise are similar in function to plates 23 and 24 of said first described embodiment. The optical unit of Figs. 6 to 9 in some respects may be preferable to that shown in Figs. 1 to 5, since the total amount of required plastic material is somewhat reduced, and, depending on the relative extent of air space 40, the light gain due to reduced absorption within the otherwise plastic prisms may exceed the light loss at surfaces 53 (Fig. 7), thereby giving a brighter overall image, but of course with this arrangement, there is not such great contrast between the bright image seen through the sighting tube, and the remaining dimmer portion of the wide field, as with the form earlier described.

In both described embodiments the novel and distinctive features of construction permit simultaneous use of the device both as a means for supplying a general view of a more or less wide field, and also with a restricted portion of the field defined and emphasized for aiming purposes, as described. In use of the device, assuming a gunner seated in a plane or tank and looking out through this viewing device in search of a target, with his line of sight along the passages 15, 16, 17, the device presents to him a generally rectangular field of view, of fair or reasonably wide extent, but necessarily somewhat dimmed by the light absorbing property of the block or blocks of material of which the device is made. One portion of the field of view (that which the gunner observes through the passages 15, 16, 17) exhibits a restricted portion of the field with some degree of brilliancy. At least, it is more brilliant than the generally rectangular field around it. Watching for a target, the operator, for example, observes an enemy airplane or tank enter the general field. As the course of his own plane or tank is changed, or as he turns his gun mount and viewing device, finally the enemy target is observed to enter the more brilliant restricted field of the passages 15, 16, 17. At that instant the operator knows that he is sighting fairly close to the mark. If he can bring the cross-hairs or other reticle into exact coincidence with the target, his aim is the more certain. But the mere appearance of the target in the more brilliant limited field is of advantage in firing ordnance.

The optical unit in both embodiments works in conjunction with a gun in such way that the gun may be aimed and discharged without exposing the operator to danger. The optical elements may be manufactured more readily and economically than those heretofore available which have required accurate and painstaking workmanship on expensive optical glass. Optical glass strips such as I have used for the facing plates, the cover strips, and possibly the mirrors, are more readily obtainable than an optical glass block of the size of the shatterproof elements here shown. The requirement in the present emergency for rapid duplication of parts from material which is immediately available and which can be economically manufactured is met by the apparatus here shown.

What I claim is:

1. A periscopic viewing and gun sighting device comprising a transparent block having parallel front and rear faces, and two opposed, internally reflecting end faces angularly disposed, at other than right angles, to said front and rear faces whereby light rays entering said block through a portion of said front face and incident to one said reflecting face are transmitted through the material of said block towards said other reflecting face and thence through a portion of said rear face, in lines out of registry with their lines of entry through said front face, said block being provided with an air passage therethrough of cross sectional area considerably less than that of said block and extending from said front face to one said reflecting face, thence to the other said reflecting face, and thence through said rear face, the wall surface bounding said passage having opaque covering means thereon, said passage having, in the neighborhood of its coincidence with said reflecting face, wall portions consisting of respective reflector means substantially coplanar with said reflecting faces whereby a group of light rays entering said passage through said front face traverse said passage, being successively reflected by said reflector means in turn, and emerge through said rear face, and whereby the periscopic field of vision of an observer at the rear face of said block is defined in part by rays transmitted through the material of said block, and in part by rays transmitted through said passage, and gun sighting means located in the line of sight through said passage so as to be superimposed on that portion of the field of view defined by said passage.

2. A periscopic viewing and gun sighting device comprising a transparent block having parallel front and rear faces, and two opposed, internally reflecting end faces angularly disposed, at other than right angles, to said front and rear faces whereby light rays entering said block through a portion of said front face and incident to one said reflecting face are transmitted through the material of said block towards said other reflecting face and thence through a portion of said rear face, in lines out of registry with their lines of entry through said front face, said block being provided with an air passage therethrough of cross sectional area considerably less than that of said block and extending from said front face to one said reflecting face, thence to the other said reflecting face, and thence through said rear face, said passage having, in the neighborhood of its coincidence with said reflecting surface, wall portions consisting of respective reflector means substantially coplanar with said reflecting faces whereby a group of light rays entering said passage through said front face traverse said passage, being successively reflected by said reflector means in turn, and emerge through said rear face, and whereby the periscopic field of vision of an observer at the rear face of said block is defined in part by rays transmitted through the material of said block, and in part by rays transmitted through said passage, the wall surface bounding said passage having opaque covering means thereon and gun sighting means located in the line of sight through said passage so as to be superimposed on that portion of the field of view defined by said passage.

3. A periscopic viewing and gun sighting device comprising a transparent block having parallel front and rear faces, and two opposed end faces angularly disposed, at other than right angles, to said front and rear faces, each said end face having a recess therein, an imperforate, transparent, plate like member seated in said recess, reflector means overlying and adhesively connected to each said end face and to said plate like member whereby light rays entering said block through a portion of said front face, and incident to one said reflector means, are transmitted through the material of said block towards said other reflector means and thence through a portion of said rear face, in lines out of registry with their lines of entry through said front face, said block being provided with an air passage therethrough of cross sectional area considerably less than that of said block and extending from said front face to one said plate member, thence to the other said plate member, and thence through said rear face, the wall surface bounding said passage having opaque covering means thereon whereby a group of light rays entering said passage through said front face traverses said passage, penetrating in turn each said plate member and being successively reflected by said reflector means in turn, and emerges through said rear face, and whereby the field of vision of an observer at the rear face of said block is defined in part by rays transmitted through the material of said block, and in part by rays transmitted through said passage, the light transmitting portion of each said front and rear face having a relatively scratch proof transparent facing strip in adhesive contact therewith, and gun sighting means carried by at least one of said facing strips within the area defined by the rays transmitted through said passage.

HARRY A. HUSTED.